(12) United States Patent
Yao et al.

(10) Patent No.: US 12,536,455 B2
(45) Date of Patent: Jan. 27, 2026

(54) METHOD FOR EARLY WARNING BRANDISH OF TRANSMISSION WIRE BASED ON IMPROVED BAYES-ADABOOST ALGORITHM

(71) Applicants: State Grid Henan Electric Power Company Electric Power Science Research Institute, Henan (CN); State Grid Henan Electric Power Company, Henan (CN); State Grid Corporation of China, Beijing (CN)

(72) Inventors: Degui Yao, Henan (CN); Ning Zhou, Henan (CN); Zhimin Guo, Henan (CN); Lei Wang, Henan (CN); Ming Lu, Henan (CN); Zhe Li, Henan (CN); Wei Zheng, Henan (CN); Shanfeng Liu, Henan (CN); Xiaolei Li, Henan (CN); Jinyu Wang, Henan (CN); Yun Liang, Henan (CN); Chao Wang, Henan (CN); Bo Zhang, Henan (CN); Yupeng Zhang, Henan (CN); Shaoguang Yuan, Henan (CN); Yangyang Tian, Henan (CN); Wandeng Mao, Henan (CN); Xiaofei Zhang, Henan (CN)

(73) Assignees: State Grid Henan Electric Power Company Electric Power Science Research Institute, Zhengzhou (CN); State Grid Henan Electric Power Company, Zhengzhou (CN); State Grid Corporation of China, Beijing (CN)

(*) Notice: Subject to any disclaimer, the term of this patent is extended or adjusted under 35 U.S.C. 154(b) by 857 days.

(21) Appl. No.: 17/747,036

(22) Filed: May 18, 2022

(65) Prior Publication Data
US 2022/0383165 A1    Dec. 1, 2022

(30) Foreign Application Priority Data

May 18, 2021    (CN) .......................... 202110541168.3

(51) Int. Cl.
G06N 7/01      (2023.01)
G01W 1/10      (2006.01)
G06F 18/214    (2023.01)

(52) U.S. Cl.
CPC ................ G06N 7/01 (2023.01); G01W 1/10 (2013.01); G06F 18/214 (2023.01); G01W 2203/00 (2013.01)

(58) Field of Classification Search
CPC ........ G06N 7/01; G06N 20/20; G06F 18/214; G01W 1/10; G01W 2203/00
See application file for complete search history.

(56) References Cited

U.S. PATENT DOCUMENTS

2019/0235011 A1* 8/2019 Pinney .................... G01S 17/50

OTHER PUBLICATIONS

Wang et al., "Early warning method for transmission line galloping based on SVM and AdaBoost bi-level classifiers," IET Gener. Transm. Distrib., 2016, vol. 10, Iss. 14, pp. 3499-3507 (Year: 2016).*

(Continued)

*Primary Examiner* — Miranda M Huang
*Assistant Examiner* — Yao David Huang (57) ABSTRACT

The present application discloses a method for early warning brandish of a transmission wire based on an improved Bayes-Adaboost algorithm, including: forming a classifier by training a historical brandish fault training set, and by using an Adaboost ensemble learning method, and obtaining an early warning result of the brandish of the transmission wire via the classifier according to real-time forecast meteorological information and information of different parameters of the transmission wire. The present invention can (Continued)

realize calculation and processing of forecast information of meteorological characteristic factors of the brandish of the transmission wire, structural parameters of the transmission wire and other related data, and obtain an early warning analysis result of a brandish disaster of the transmission wire in a region.

9 Claims, 2 Drawing Sheets

(56) References Cited

OTHER PUBLICATIONS

Raftery et al., "Using Bayesian Model Averaging to Calibrate Forecast Ensembles," Monthly Weather Review, vol. 133: Issue 5, pp. 1155-1174 (2005) (Year: 2005).*

Jones et al., "The Development of a U.S. Climatology of Extreme Ice Loads," National Climatic Data Center Technical Report Jan. 2002, Dec. 2002 (Year: 2002).*

Musilek et al., "An Ice Accretion Forecasting System (IAFS) for Power Transmission Lines Using Numerical Weather Prediction," SOLA, 2009, vol. 5, 025-028, doi:10.2151/sola.2009-007 (Year: 2009).*

Kullolli et al., "Design Against the Vulnerability of Overhead Transmission Line Caused by Galloping," International Journal of Advances in Engineering & Technology, Sep. 2014 (Year: 2014).*

Li et al., "Using Naive Bayes with AdaBoost to Enhance Network Anomaly Intrusion Detection," 2010 Third International Conference on Intelligent Networks and Intelligent Systems (Year: 2010).*

Ahammed et al., "Hybrid AdaBoost and Naïve Bayes Classifier for Supervised Learning," Proceedings of the 1st Conference on Information Technology and Data Science Debrecen, Hungary, Nov. 6-8, 2020 (Year: 2020).*

Mou et al., "Prediction method for galloping features of transmission lines based on FEM and machine learning," Cold Regions Science and Technology 173 (2020) 103031 (Year: 2020).*

\* cited by examiner

METHOD FOR EARLY WARNING BRANDISH OF TRANSMISSION WIRE BASED ON IMPROVED BAYES-ADABOOST ALGORITHM

CROSS REFERENCE TO RELATED APPLICATIONS

The present application claims the benefit of Chinese Patent Application No. 202110541168.3 filed on May 18, 2021, the contents of which are incorporated herein by reference in their entirety.

TECHNICAL FIELD

The present invention belongs to the field of transmission wire brandish early warning technology, and relates to a method for early warning brandish of a transmission wire based on improved Bayes-Adaboost algorithm.

BACKGROUND

Because a physical model of brandish of a transmission wire in the prior art is not accurate enough, and a part of parameters in the model is difficult to obtain through measurement on an actual wire, practicability and accuracy of using the physical model for early warning of the brandish of the transmission wire are low.

Machine learning obtains a more accurate prediction based on past observations, and provides a method for obtaining laws that cannot be obtained through principle analysis from observational data, and then predicting future data with these laws. Therefore, a machine learning theory can be well applied to a method for early warning the brandish of the transmission wire.

SUMMARY

In order to solve the deficiencies in the prior art, the present application provides a method for early warning brandish of a transmission wire based on improved Bayes-Adaboost algorithm.

In order to achieve the forgoing objectives, the present invention uses the following solutions:

A method for early warning brandish of a transmission wire based on an improved Bayes-Adaboost algorithm includes the following steps:

Step 1: classifying and combining the transmission wires according to internal factors that affect brandish excitation of the transmission wire, that is, parameters of a wire, to form a plurality of wire combinations;

Step 2: statistically classifying historical brandish meteorological characteristic factors of the transmission wire that affect brandish excitation external factors of the transmission wire, to obtain meteorological characteristic factors of the brandish of the transmission wire;

Step 3: obtaining historical brandish meteorological characteristic factor data sets of a plurality of wire combinations;

Step 4: obtaining the historical brandish meteorological characteristic factor data sets of this wire according to wire parameters of a prediction wire;

Step 5: forming a strong classification learner with an Adaboost ensemble learning algorithm by using the data sets of Step 4;

Step 6: obtaining a real-time meteorological forecast data x of the brandish meteorological characteristic factors of the transmission wire;

Step 7: according to the real-time meteorological forecast data x in Step 6, obtaining an output of a brandish early warning model of the transmission wire via the strong classification learner in Step 5, comprising a prediction result y of the strong classification learner and a confidence margin (x, y);

Step 8: according to an output result of the early warning model in Step 7, determining that an early warning level of a transmission wire brandish risk is obtained;

Step 9: for a newly added brandish fault sample, correcting the brandish early warning model according to change rates of temperature and humidity, optimizing the output of the brandish early warning model according to Bayes, and re-predicting a brandish probability;

Step 10: obtaining an early warning probability and an early warning level of brandish of a final transmission wire according to an aerial meteorological condition and a predicted probability of Step 9.

The present invention further includes the following preferred solutions:

Preferably, three wire parameters are selected, namely a wire structure, a wire section area, and a span.

The wire structure is divided into a single wire and a split wire;

The wire area is divided into three tap positions. An area not exceeding a first set area is a first wire area tap position. An area greater than the first wire set area and not exceeding a second set area is a second wire area tap position, and an area greater than the second set area is a third wire tap position;

The span is divided into three tap positions. A span not exceeding a first set span is a first span tap position. A span greater than a first wire set span and not exceeding a second set span is a second wire tap position, and a span greater than the second set span is a third wire tap position.

Preferably, in Step 2, the historical brandish meteorological characteristic factors of the transmission wire are statistically classified to obtain the brandish meteorological characteristic factors of the transmission wire, including: a wind speed, an included angle between a wind direction and a wire axis, a temperature, and a relative humidity, and the wind speed is the wind speed at a height of a wire.

Preferably, forming the strong classification learner with the Adaboost ensemble learning algorithm in Step 5 is specifically as follows:

Step 5.1: inputting a brandish training sample set of the transmission wire $X=\{(x1,y1), (x2,y2), \ldots, (xN,yN)\}$;

Where, $x_i$ is a meteorological characteristic factor vector of a brandish sample of an i-th transmission wire. $i=1, 2, \ldots, N$, N is the number of training samples.

$y_i=\{-1,1\}$ indicates a category label of an i-th sample: $-1$ indicates that the transmission wire does not brandish, and 1 indicates that the transmission wire brandishes.

Step 5.2: initializing a sample weight distribution $w_1(i)=1/N$, $i=1, 2, \ldots, N$.

Step 5.3: denoting T as the number of training times, that is, the number of weak classifiers, when $t=1, 2, \ldots, T$:

Step 5.3.1: sampling with replacement from an original sample set X according to a t-th sample weight distribution $w_t(i)$ to generate a new sample set $X_t$.

Step 5.3.2: training a weak classifier $C_t(X)$ on $X_t$, and classifying the original sample set X with $C_t(X)$.

Step 5.3.3: calculating a classification error rate of the weak classifier $C_t(X)$.

$$\varepsilon_i = \sum_{i=1}^{N} w_t(i) I(C_t(x_i) \neq y_i) \quad (2)$$

In formula (2), when $C_t(x_i) \neq y_i$, $I(\bullet)$ is 1, and the rest are 0.

Step 5.3.4: calculating a coefficient of the weak classifier $C_t(X)$.

$$a_t = \frac{1}{2} \ln\left(\frac{1-\varepsilon_t}{\varepsilon_t}\right) \quad (3)$$

Step 5.3.5: updating the weight distribution.

$$w_{t+1}(i) = \frac{w_t(i)}{Z_t} \times \begin{cases} e^{-a_t}, & C_t(x_i) = y_i \\ e^{a_t}, & C_t(x_i) \neq y_i \end{cases} = \frac{w_t(i)}{Z_t} \cdot e^{-a_t y_i C_t(x_i)}, \quad (4)$$

$$i = 1, 2, \ldots, N$$

In formula (4), $$Z_t = \sum_{i=1}^{N} w_t(i) \cdot e^{-a_t y_i C_t(x_i)}$$

is a normalization factor such that $$\sum_{i=1}^{N} w_{t+1}(i) = 1;$$

Step 5.4: outputting the final classifier, that is, the strong classification learner:

$$C(X) = \text{sgn}\left[\sum_{t=1}^{T} a_t C_t(X)\right] \quad (5)$$

In formula (5), a function sgn(•) is a symbolic function, and a specific mathematical expression of the function is:

$$\text{sgn}(k) = \begin{cases} 1, & k \geq 0 \\ -1, & k < 0 \end{cases}. \quad (6)$$

Preferably, the weak classifier described in Step 5 selects a commonly used single-layer decision tree, and evaluates pros and cons of a segmentation rule with a Gini impurity index, and a data set S containing c categories is defined as follows:

$$\text{gini}(S) = 1 - \sum_{j=1}^{c} p_j^2 \quad (7)$$

In the formula, $p_j$ represents a proportion of samples of a category j in the set S.

If a partition rule divides S into two subsets, $S_1$ and $S_2$, the Gini evaluation value of the rule is recorded as:

$$\text{gini}(S, \text{rule}) = \frac{n_1}{n} \cdot \text{gini}(S_1) + \frac{n_2}{n} \cdot \text{gini}(S_2) \quad (8)$$

In the formula, $n_1$ is the number of samples in the subset $S_1$, $n_2$ is the number of samples in the subset $S_2$, and n is the number of samples in the set S.

Preferably, for one numerical attribute, an idea of binary classification decision pile segmentation based on a Gini index is as follows: after traversing all possible segmentation methods, the segmentation method that minimizes an evaluation value Gini(S,rule) is selected as an optimal segmentation rule at this node, specifically:

1) The sample values of the numerical attribute are sorted, assuming that sorted results are $(x_1,y_1), (x_2,y_2), \ldots, (x_n,y_n)$; $y_i$ (i=1, 2, ..., n) is a category label.

2) Since the segmentation only occurs between two data points, a midpoint $(x_i+x_i+1)/2$ is taken as a dividing point, different dividing points from small to large are then taken, and a Gini value of each dividing rule is calculated according to formula (7) and formula (8).

3) A point with the smallest Gini value is taken as the best split point, and a decision pile is constructed with the split point as a threshold.

Preferably, in step 7, an output of the brandish early warning model of the transmission wire comprises a prediction result y of the classifier and a confidence margin (x, y), specifically:

$$y = C(X) = \text{sgn}\left[\sum_{t=1}^{T} a_t C_t(X)\right] \quad (9)$$

$$\text{margin}(x, y) = \frac{\sum_t a_t C_t(x)}{\sum_t |a_t|} \quad (10)$$

In the formula, x is the real-time meteorological forecast data of the brandish meteorological characteristic factors of the transmission wire.

$y \in \{-1,+1\}$, the prediction result of the classifier is as follows: 1 is a prediction that the transmission wire brandishes, and −1 is a prediction that the transmission wire does not brandish;

margin$\in [-1,+1]$, a larger positive margin indicates a high confidence in predicting that the wire brandishes. A larger negative margin indicates a high confidence in predicting that the wire does not brandish. A smaller margin, that is, a margin closer to 0, indicates a lower confidence of the prediction result.

Preferably, in step 9, the brandish early warning model is corrected according to the change rates of the temperature and the humidity, and the brandish probability is re-predicted according to the Bayes on the output of the brandish early warning model, specifically:

At a current temperature, a probability of whether the transmission wire brandishes is a conditional probability of the brandish under a current meteorological-related characteristic parameters, and a formula is as follows:

$$P(s|X) = \text{margin}(x,y) = C \cdot \Pi P(x_i \cdot \text{ROTC}_i \cdot \text{HOTC}_i|s) = C \cdot \Pi$$
$$(P(x_i|s)) \cdot P(\text{ROTC}_i|s) \cdot P(\text{HOTC}_i|s) \quad (15)$$

s is a state of the transmission wire, that is, whether the transmission wire brandishes.

X is characteristic parameters related to a current meteorological condition.

$P(ROTC_i|s)$ is the change rate of the temperature of a brandish fault in the current meteorological condition;

$P(HOTC_i|s)$ is a change rate of a humidity of the brandish fault in the current meteorological condition.

C is a total probability of the brandish so far.

The weak classifier $C_t(X)$ is as follows:

$$C_t(X) = P(x_i|s) = \frac{Count_{xi}}{Count_s} \tag{17}$$

$P(x_i|s)$ is a weight of a single feature parameter $x_i$.

$Count_{xi}$ is the number of the brandishes that occur under the condition of an i-th characteristic parameter, and $Count_s$ is the number of all brandishes.

For the newly added brandish fault sample, after each brandish event occurs, the weight of the single feature parameter is dynamically updated.

A $$\tilde{C}_t(X) = P(x_{inew}|s) = \frac{Count_{xi} + i}{Count_s + i}. \tag{18}$$

Finally, a final brandish probability is obtained by substituting formula (18) into formula (15) to replace a result of a single weak classifier $C_t(X)$.

Preferably, characteristic parameters related to the meteorological condition comprise a maximum temperature, a minimum temperature, an average temperature, the change rate of the temperature in a first 24 hours, the humidity, the change rate of the humidity in the first 24 hours, a maximum wind speed, a minimum wind speed, an average wind speed, an included angle between the wind directions of the wire, a wire diameter, and the number of splits of the transmission wire.

Preferably, in step 10, the early warning level is divided according to the prediction probability in Step 9, and aerial meteorological information is introduced, that is: a freezing rain prediction result. If a freezing rain is provided in a brandish prediction area, a first-level early warning level is increased. If no freezing rain is provided, the early warning level remains unchanged, and the early warning probability and the early warning level of the brandish of the final transmission wire are output.

The present application has the following beneficial effects:

The present invention forms a classifier by training a historical brandish fault training set, and by using an Adaboost ensemble learning method, and obtains an early warning result of the brandish of the transmission wire via the classifier according to real-time forecast meteorological information and information of different parameters of the transmission wire. Additionally, a model is fixed. A brandish fault sample that newly occurs cannot correct the model. Additionally, energy accumulation information of meteorological information is not considered, such as a continuous decline of a temperature and a continuous growth of ice coating.

On this basis, the present invention corrects the model according to a Bayes formula for a newly added brandish fault sample. Additionally, the related influence parameters of the energy accumulation on the brandish in the model are added and reflected by change rates of a temperature and a humidity to further form a method for early warning brandish of a transmission wire based on an improved Bayes-Adaboost algorithm. Bayes is a Bayesian formula, and a fundamental condition of the Bayes is conditional probability. An Adaboost algorithm is an adaptive boosting (Adaboost for short) algorithm in an ensemble learning algorithm. A basic idea of the Adaboost algorithm is to use a large number of weak classifiers with general classification ability, which is superimposed and aggregated by a certain method to form a final classifier (a strong classifier) with stronger classification ability.

The present invention can realize calculation and processing of forecast information of meteorological characteristic factors of the brandish of the transmission wire, structural parameters of the transmission wire and other related data, and obtain an early warning analysis result of a brandish disaster of the transmission wire in a region.

BRIEF DESCRIPTION OF THE DIAGRAMS

DESCRIPTION OF THE INVENTION

The present application is further described below in conjunction with the accompanying drawings. The following embodiments are only used to describe the technical solutions of the present invention more clearly, and cannot be used to limit the protection scope of the present application.

Figure 1:
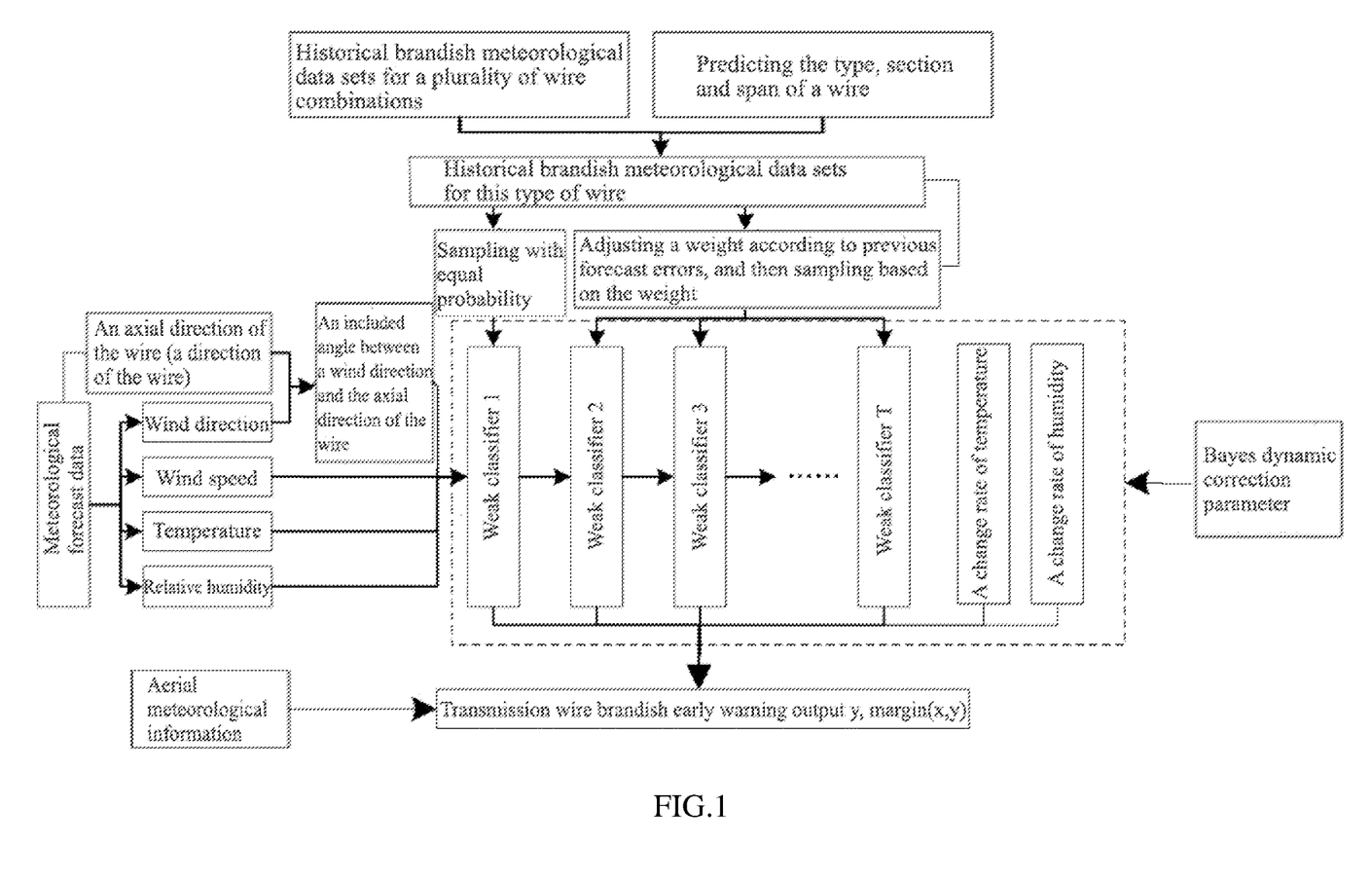
FIG. 1 is a flow chart of a method for early warning brandish of a transmission wire based on an improved Bayes-Adaboost algorithm of the present invention.

As shown in FIG. 1, a method for early warning brandish of a transmission wire based on an improved Bayes-Adaboost algorithm includes the following steps:

Step 1: classifying and combining the transmission wires according to internal factors that affect brandish excitation of the transmission wire, that is, parameters of a wire, to form a plurality of wire combinations.

The person skilled in the art can arbitrarily select the types and quantities of wire parameters to classify and combine the transmission wires. A preferred but non-limiting implementation is to select three wire parameters, namely a wire structure, a wire section area, and a span.

The wire structure is divided into a single wire and a split wire;

The wire area is divided into a plurality of tap positions, for example but not limited to three tap positions. An area not exceeding a first set area is a first wire area tap position. An area greater than the first wire set area and not exceeding a second set area is a second wire area tap position, and an area greater than the second set area is a third wire tap position;

Similarly, the span can be divided into a plurality of tap positions, for example, but not limited to three tap positions. A span not exceeding a first set span is a first span tap position. A span greater than a first wire set span and not exceeding a second set span is a second wire tap position, and a span greater than the second set span is a third wire tap position.

In a case that the wire structure is divided into two types, and the wire area and the span are divided into three tap positions, respectively, the total number of types of transmission wires is 2×3×3=18 types, such as "a split wire—the second wire tap position—the first span tap position" is one of classification types.

It is worth noting that the person skilled in the art can select more or less wire parameters, set more or less tap positions in each wire parameter within or outside the forgoing three wire parameters, and select different tap positions to divide a boundary value. In a case that an amount of data that can be used for training is sufficient to satisfy a classification type of the single transmission wire, more classification types are beneficial for the early warning.

In a specific implementation, internal factors that affect the brandish excitation of the transmission wire (the internal factors of the brandish of the transmission wire refer to the internal factors that affect the brandish excitation of the transmission wire)—the wire structure and parameters are classified as shown in Table 1, and a total of 18 combinations are obtained, such as: a single wire, a small section, and a small span wire are one combination.

TABLE 1

Classification statistics of internal factors of brandish of a wire

| Internal factors | Type of a wire structure | Section S (mm) of the wire | Span L (m) |
|---|---|---|---|
| Classification | Single wire Split wire | Small (S ≤ 150) Middle (150 < S ≤ 300) — | Small (L ≤ 300) Middle (300 < L ≤ 600) Large (L ≥ 600) |

Step 2: statistically classifying historical brandish meteorological characteristic factors of the transmission wire that affect brandish excitation external factors of the transmission wire, to obtain meteorological characteristic factors of the brandish of the transmission wire.

The meteorological characteristic factors of the brandish of the transmission wire refer to external meteorological factors that affect the brandish excitation of transmission wire. An external factor of information of the historical brandish meteorological characteristic factors of transmission wires is statistically classified, to obtain the meteorological characteristic factors of the brandish of the transmission wire, including: a wind speed, an included angle between a wind direction and a wire axis, a temperature, and a relative humidity.

It is worth noting that because a change of height affects the wind speed, a wind speed observed by a meteorological station and a wind speed of a meteorological forecast are generally a wind speed at a height of 10 m above the ground by default. Therefore, the wind speed is uniformly converted to a wind speed vi at a height of the wire according to the following formula.

$$v_l = v_q \cdot \left(\frac{H}{10}\right)^\mu \quad (1)$$

In the formula, $v_q$ is the wind speed at the height of 10 m above the ground. H is the height of the wire (m). μ is a ground roughness index, which is 0.12, 0.15, 0.22 and 0.30 according to four types of sea, a country, a city and a big city center.

Step 3: obtaining historical brandish meteorological characteristic factor data sets of a plurality of wire combinations.

Step 4: obtaining the historical brandish meteorological characteristic factor data sets of this wire according to wire parameters of a prediction wire.

Step 5: forming a strong classification learner with an Adaboost ensemble learning algorithm by using the data sets of Step 4;

Step 6: obtaining a real-time meteorological forecast data x of the brandish meteorological characteristic factors of the transmission wire, including: the wind speed, the temperature, the relative humidity, and an included angle between a wind direction obtained according to an axial direction of the wire (a direction of the wire) and an axial direction of the wire.

Step 7: according to the real-time meteorological forecast data x in Step 6, obtaining an output of a brandish early warning model of the transmission wire via the strong classification learner in Step 5, comprising a prediction result y of the strong classification learner and a confidence margin (x, y).

Steps 3-7 are as follows: selecting one of the forgoing 18 combinations according to an actual situation of the transmission wire to be tested, recording information of the meteorological characteristic factors under a historical brandish accident of the transmission wire described in Step 3, constructing a brandish training sample set of the transmission wire, forming a strong classification learner with the following Adaboost ensemble learning algorithm, and early warning the brandish of the transmission wire according to a forecast data of meteorological characteristic factors provided by a meteorological department.

forming the strong classification learner with the Adaboost ensemble learning algorithm in Step 5 is specifically as follows:

Step 5.1: inputting the brandish training sample set of the transmission wire X={(x1,y1), (x2,y2), . . . , (xN,yN)};

Where, $x_i$ is a meteorological characteristic factor vector of a brandish sample of an i-th transmission wire. i=1, 2, . . . , N, N is the number of training samples.

$y_i$={−1,1} indicates a category label of an i-th sample: −1 indicates that the transmission wire does not brandish, and 1 indicates that the transmission wire brandishes.

A classification algorithm of the weak classifier adopts a single-layer decision tree of the method in the prior art, and can also adopt the method in the prior art that can be realized with a support vector machine and the like.

Step 5.2: initializing a sample weight distribution $w_1(i)$= 1/N, i=1, 2, . . . , N.

Step 5.3: denoting T as the number of training times, that is, the number of weak classifiers, when t=1, 2, . . . , T.

Step 5.3.1: sampling with replacement from an original sample set X according to a t-th sample weight distribution $w_t(i)$ to generate a new sample set $X_t$.

Step 5.3.2: training a weak classifier $C_t(X)$ on $X_t$, and classifying the original sample set X with $C_t(X)$.

Step 5.3.3: calculating a classification error rate of the weak classifier $C_t(X)$.

$$\varepsilon_t = \sum_{i=1}^{N} w_t(i) I(C_t(x_i) \neq y_i) \quad (2)$$

In formula (2), when $C_t(x_i) \neq y_i$, I(•) is 1, and the rest are 0.

Step 5.3.4: calculating a coefficient of the weak classifier $C_t(X)$.

$$a_t = \frac{1}{2}\ln\left(\frac{1-\varepsilon_t}{\varepsilon_t}\right) \quad (3)$$

Step 5.3.5: updating the weight distribution.

$$w_{t+1}(i) = \frac{w_t(i)}{Z_t} \times \begin{cases} e^{-a_t}, & C_t(x_i) = y_i \\ e^{a_t}, & C_t(x_i) \neq y_i \end{cases} = \frac{w_t(i)}{Z_t} \cdot e^{-a_t y_i C_t(x_i)}, \quad (4)$$

$$i = 1, 2, \ldots, N$$

In formula (4), $$Z_t = \sum_{i=1}^{N} w_t(i) \cdot e^{-a_t y_i C_t(x_i)}$$

is a normalization factor such that $$\sum_{i=1}^{N} w_{t+1}(i) = 1;$$

Step 5.4: outputting the final classifier, that is, the strong classification learner:

$$C(X) = \mathrm{sgn}\left[\sum_{t=1}^{T} a_t C_t(X)\right] \quad (5)$$

In formula (5), a function sgn(•) is a symbolic function, and a specific mathematical expression of the function is:

$$\mathrm{sgn}(k) = \begin{cases} 1, & k \geq 0 \\ -1, & k < 0 \end{cases}. \quad (6)$$

Further, the weak classifier described in Step 5 selects a commonly used single-layer decision tree, which makes a decision only based on a single input feature and with a threshold division method, that is, only one node is provided. Because this tree has only one splitting process, and is similar to a tree pile in shape, this tree is also called as a decision pile. The most critical problem in the construction of the decision pile is how to determine the quality of a threshold division result, so as to select the best segmentation point.

Figure 2:
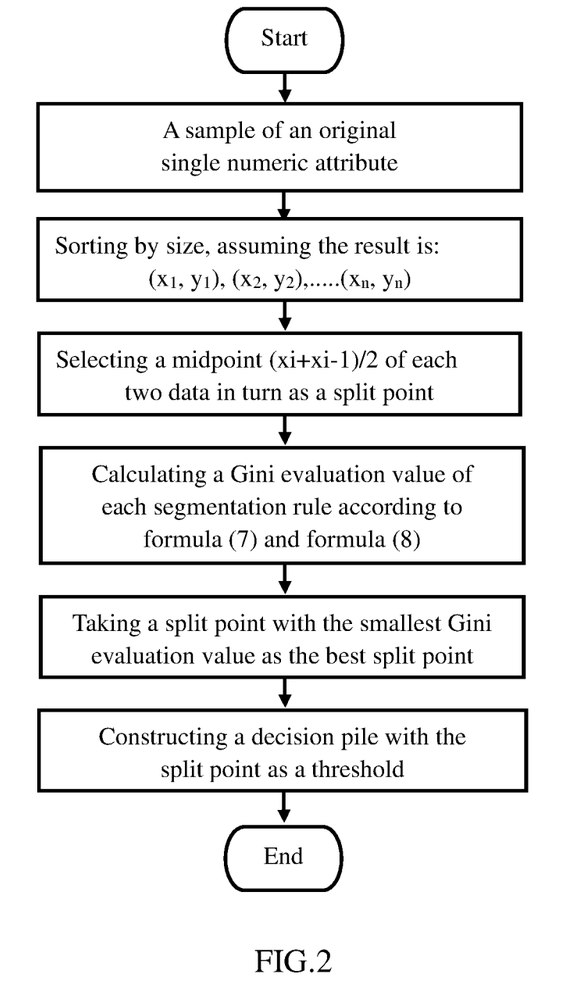
FIG. 2 is a flow chart of binary decision pile segmentation based on a Gini index.

In this embodiment, pros and cons of a segmentation rule are evaluated with a Gini impurity index. A data set S containing c categories is defined as follows:

$$gini(S) = 1 - \sum_{j=1}^{c} p_j^2 \quad (7)$$

In the formula, $p_j$ represents a proportion of samples of a category j in the set S.

If a partition rule divides S into two subsets, $S_1$ and $S_2$, the Gini evaluation value of the rule is recorded as:

$$gini(S, \text{rule}) = \frac{n_1}{n} \cdot gini(S_1) + \frac{n_2}{n} \cdot gini(S_2) \quad (8)$$

In the formula, $n_1$ is the number of samples in the subset $S_1$, $n_2$ is the number of samples in the subset $S_2$, and n is the number of samples in the set S.

For one numerical attribute, an idea of binary classification decision pile segmentation based on a Gini index is as follows: after traversing all possible segmentation methods, the segmentation method that minimizes an evaluation value Gini(S,rule) is selected as an optimal segmentation rule at this node. A process is shown in FIG. 2 and described as:

1) The sample values of the numerical attribute are sorted, assuming that sorted results are $(x_1,y_1), (x_2,y_2), \ldots, (x_n,y_n)$; $y_i$ (i=1, 2, . . . , n) is a category label.

2) Since the segmentation only occurs between two data points, a midpoint $(x_i+x_i+1)/2$ is taken as a dividing point, different dividing points from small to large are then taken, and a Gini value of each dividing rule is calculated according to formula (7) and formula (8).

3) A point with the smallest Gini value is taken as the best split point, and the decision pile is constructed with the split point as a threshold.

Further, in step 7, an output of the brandish early warning model of the transmission wire comprises a prediction result y of the classifier and a confidence margin (x, y):

$$y = C(X) = \mathrm{sgn}\left[\sum_{t=1}^{T} a_t C_t(X)\right] \quad (9)$$

$$\mathrm{margin}(x, y) = \frac{\sum_t a_t C_t(x)}{\sum_t |a_t|} \quad (10)$$

In the formula, x is real-time meteorological forecast data of the brandish meteorological characteristic factors of the transmission wire.

$y \in \{-1,+1\}$, the prediction result of the classifier is as follows: 1 is a prediction that the transmission wire brandishes, and −1 is a prediction that the transmission wire does not brandish;

margin∈ [−1,+1], a larger positive margin (i.e., closer to 1) indicates a high confidence in predicting that the wire brandishes. A larger negative margin (i.e., closer to −1) indicates a high confidence in predicting that the wire does not brandish. A smaller margin, that is, a margin closer to 0, indicates a lower confidence of the prediction result.

Step 8: according to an output result of the early warning model in Step 7, determining that an early warning level of a transmission wire brandish risk is obtained;

In the specific implementation, a risk early warning level of the brandish of the transmission wire can be determined according to a margin value as shown in Table 3.

TABLE 2

| | the risk early warning level of the brandish of the transmission wire |
|---|---|
| Conditions | Early warning level |
| 0.7 < margin | Level I |
| 0.5 < margin ≤ 0.7 | Level II |
| 0.3 < margin ≤ 0.5 | Level III |

Step 9: for a newly added brandish fault sample, in order to realize self-learning of the brandish early warning model, considering the influence of energy accumulation on the brandish, adding time accumulation and spatial dimension information, that is, the change rates of the temperature and the humidity, to correct the model. According to Bayes, the formulas (9) and (10) of the forgoing method are optimized, and a brandish probability is predicted again.

At a current temperature, a probability of whether the transmission wire brandishes is solved, that is, a conditional probability of the brandish under a current meteorological-related characteristic parameter is solved.

According to a Bayesian formula:

$$P(s|X) = \frac{p(s,X)}{p(X)} = \frac{p(X|s) \cdot p(s)}{p(X)} \quad (11)$$

Where, s is a state of the transmission wire, that is, whether the transmission wire brandishes.

X is characteristic parameters related to a current meteorological condition and the like.

P(s) is a total probability of the brandish so far, and is a fixed value C.

P(X) is a probability that the meteorological condition occurs on that day, and a value in the formula is 1.

2) The forgoing formula can be simplified as:

$$P(s|X) = \frac{P(s,X)}{P(X)} = \frac{P(X|s) \cdot P(s)}{P(X)} \quad (12)$$

Because C is the fixed value, that is, a probability of occurrence of the current meteorological condition when a final result is that brandish occurs.

In an experiment, the selected characteristic parameters are a maximum temperature, a minimum temperature, an average temperature, the change rate of the temperature in a first 24 hours, the humidity, the change rate of the humidity in the first 24 hours, a maximum wind speed, a minimum wind speed, an average wind speed, an included angle between the wind directions of the wire, a wire diameter, and the number of splits of the transmission wire.

Considering that C is the fixed value, the probability formula can be in the following form:

$$P(s|X) = p(X|s) \cdot C = C \cdot P(x_1, x_2 \ldots x_n | s) \quad (13)$$

Considering the independent distribution characteristics of the temperature, the humidity, the wind speed and other related characteristic parameters, formula (11) can be written as the following form:

$$P(s|X) = C \cdot P(x_1, x_2 \ldots x_n | s) = C \cdot \Pi P(x_i | s) \quad (14)$$

Where P(s|X)=margin(x, y)

Considering the influence of the energy accumulation on the brandish, the time accumulation and the spatial dimension information, that is, the change rates of the temperature and the humidity are added, to correct a model pair. The formula (14) is corrected as:

$$P(s|X) = \text{margin}(x,y) = C \cdot \Pi P(x_i \cdot ROTC_i \cdot HOTC_i | s) = C \cdot \Pi (P(x_i | s)) \cdot P(ROTC_i | s) \cdot P(HOTC_i | s) \quad (15)$$

$P(ROTC_i | s)$ is a change rate of a temperature of a brandish fault in the current meteorological condition.

$P(HOTC_i | s)$ is a change rate of a humidity of the brandish fault in the current meteorological condition.

An equivalent calculation method of a weight of a single characteristic parameter is as follows:

$$P(x_i | s) = \frac{Count_{xi}}{Count_s} \quad (16)$$

Where $Count_{si}$ is the number of the brandishes that occur under the condition of an i-th characteristic parameter, and $Count_s$ is the number of all brandishes.

According to $$C(X) = \text{sgn}\left[\sum_{t=1}^{T} a_t C_t(X)\right]$$

and P(s|X)=margin(x, y) in formula (5), the following formula is obtained:

$$C_t(X) = P(x_i | s) = \frac{Count_{xi}}{Count_s}$$

For the newly added brandish fault sample, after each brandish event occurs, the weight of the feature parameter is dynamically updated. An update formula is as follows:

$$P(x_{inew} | s) = \frac{Count_{xi} + i}{Count_s + i} \quad (18)$$

Finally, a final brandish probability is obtained by substituting formula (18) into formula (15) to replace a result of a single weak classifier $C_t(X)$.

Since the brandish of the transmission wire is a small probability event, in the process of the early warning of the brandish, a maximum probability in the forgoing formula (15) combined with a probability weight is adjusted to be close to 100%.

During the specific implementation, according to actual forecast data of a meteorological bureau, characteristic parameters used in the prediction of the brandish probability are the average temperature, the humidity, an average wind speed, a wire diameter, the number of splits, an included angel between the wind speeds of the wire, the change rate of the temperature, and the change rate of the humidity.

In step 10, the early warning level is divided according to the prediction probability as shown in Table, and aerial meteorological information is introduced, that is: a freezing rain prediction result. If a freezing rain is provided in a brandish prediction area, a first-level early warning level is increased. If no freezing rain is provided, the early warning level remains unchanged, and an early warning probability and an early warning level of the brandish of the final transmission wire are obtained.

TABLE 3

The table of the early warning level of the brandish of the transmission wire

| Condition | Early warning level |
|---|---|
| 0.7 < P | Level I |
| 0.5 < P <= 0.7 | Level II |
| 0.3 < P <= 0.5 | Level III |

The present invention realizes self-learning through Bayes, and realizes probability early warning of a wire segment through an Adaboost ensemble learning method, with a smaller and more accurate prediction dimension.

The applicant of the present invention describes the embodiments of the present invention in detail with reference to the accompanying drawings. However, the person skilled in the art should understand that the forgoing embodiments are only preferred embodiments of the present invention. The detailed description is only to help readers better understand the spirit of the present invention rather than limiting the protection scope of the present invention. Oppositely, any improvement or modification based on the spirit of the present invention should fall within the protection scope of the present invention.

What is claimed is:

1. A method for early warning of brandish of a transmission wire based on an Bayes-Adaboost algorithm, comprising:

Step 1: classifying and combining transmission wires according to internal factors that affect brandish excitation of the transmission wire, that is, parameters of the wire, to form a plurality of wire combinations;

Step 2: statistically classifying historical brandish meteorological characteristic factors of the transmission wire that affect brandish excitation external factors of the transmission wire, to obtain meteorological characteristic factors of the brandish of the transmission wire;

Step 3: obtaining historical brandish meteorological characteristic factor data sets of the plurality of wire combinations;

Step 4: obtaining the historical brandish meteorological characteristic factor data sets of the transmission wire according to wire parameters of a prediction wire;

Step 5: forming a strong classification learner with an Adaboost ensemble learning algorithm by using the data sets of Step 4;

Step 6: obtaining a real-time meteorological forecast data x of the brandish meteorological characteristic factors of the transmission wire;

Step 7: according to the real-time meteorological forecast data x in Step 6, obtaining an output of a brandish early warning model of the transmission wire via the strong classification learner in Step 5, comprising a prediction result y of the strong classification learner and a confidence margin(x, y);

Step 8: according to an output result of the early warning model in Step 7, determining that an early warning level of a transmission wire brandish risk is obtained;

Step 9: for a newly added brandish fault sample, correcting a brandish early warning model pair according to change rates of temperature and humidity, optimizing the output of the brandish early warning model according to Bayes, and re-predicting a brandish probability, wherein:

the brandish early warning model is corrected according to the change rates of the temperature and the humidity, and the brandish probability is re-predicted according to the Bayes on the output of the brandish early warning model, specifically:

at a current temperature, a probability of whether the transmission wire brandishes is a conditional probability of the brandish under a current meteorological-related characteristic parameters, and a formula is as follows:

$$P(s|X) = \text{margin}(x,y) = C \cdot \Pi P(x_i \cdot \text{ROTC}_i \cdot \text{HOTC}_i | s) = C \cdot \Pi (P(x_i|s)) \cdot P(\text{ROTC}_i|s) \cdot P(\text{HOTC}_i|s) \quad (15)$$

s is a state of the transmission wire, that is, whether the transmission wire brandishes;

X is characteristic parameters related to a current meteorological condition;

$P(\text{ROTC}_i|s)$ is a change rate of a temperature of a brandish fault in the current meteorological condition;

$P(\text{HOTC}_i|s)$ is a change rate of a humidity of the brandish fault in the current meteorological condition;

C is a total probability of the brandish so far;

a weak classifier $C_t(X)$ is as follows:

$$C_t(X) = P(x_i | s) = \frac{Count_{xi}}{Count_s} \quad (17)$$

$P(x_i|s)$ is a weight of a single feature parameter $x_i$;

$Count_{si}$ is the number of the brandishes that occur under the condition of an i-th characteristic parameter, and $Count_s$ is the number of all brandishes;

for the newly added brandish fault sample, after each brandish event occurs, the weight of the single feature parameter is dynamically updated, and an update formula (17) is as follows:

$$\tilde{C}_t(X) = P(x_{inew} | s) = \frac{Count_{xi} + i}{Count_s + i} \quad (18)$$

finally, a final brandish probability is obtained by substituting formula (18) into formula (15) to replace a result of a single weak classifier $C_t(X)$;

Step 10: obtaining an early warning probability and an early warning level of brandish of a final transmission wire according to an aerial meteorological condition and a predicted probability of Step 9.

2. The method for early warning of the brandish of the transmission wire based on the Bayes-Adaboost algorithm according to claim 1, wherein:

in Step 1, three wire parameters are selected, namely a wire structure, a wire section area, and a span;

the wire structure is divided into a single wire and a split wire;

the wire area is divided into three tap positions, an area not exceeding a first set area is a first wire area tap position, an area greater than the first wire set area and not exceeding a second set area is a second wire area tap position, and an area greater than the second set area is a third wire tap position;

the span is divided into three tap positions, a span not exceeding a first set span is a first span tap position, a span greater than a first wire set span and not exceeding a second set span is a second wire tap position, and a span greater than the second set span is a third wire tap position.

3. The method for early warning of the brandish of the transmission wire based on the Bayes-Adaboost algorithm according to claim 1, wherein:
in Step 2, the historical brandish meteorological characteristic factors of the transmission wire are statistically classified to obtain the brandish meteorological characteristic factors of the transmission wire, comprising: a wind speed, an included angle between a wind direction and a wire axis, a temperature, and a relative humidity, and the wind speed is the wind speed at a height of a wire.

4. The method for early warning of the brandish of the transmission wire based on the Bayes-Adaboost algorithm according to claim 1, wherein:
forming the strong classification learner with the Adaboost ensemble learning algorithm in Step 5 is specifically as follows:
Step 5.1: inputting a brandish training sample set of the transmission wire X={(x1,y1), (x2,y2), ..., (xN, yN)}; wherein, $x_i$ is a meteorological characteristic factor vector of a brandish sample of an i-th transmission wire, i=1, 2, ..., N, N is the number of training samples;
$y_i$={−1,1} indicates a category label of an i-th sample: −1 indicates that the transmission wire does not brandish, and 1 indicates that the transmission wire brandishes;
Step 5.2: initializing a sample weight distribution $w_1(i)$=1/N, i=1, 2, ..., N;
Step 5.3: denoting T as the number of training times, that is, the number of weak classifiers, when t=1, 2, ..., T:
Step 5.3.1: sampling with replacement from an original sample set X according to a t-th sample weight distribution $w_t(i)$ to generate a new sample set $X_t$;
Step 5.3.2: training the weak classifier $C_t(X)$ on $X_t$, and classifying the original sample set X with $C_t(X)$;
Step 5.3.3: calculating a classification error rate of the weak classifier $C_t(X)$;

$$\varepsilon_t = \sum_{i=1}^{N} w_t(i) I(C_t(x_i) \neq y_i) \quad (2)$$

in formula (2), when $C_t(x_i) \neq y_i$, I(•) is 1, and the rest are 0;
Step 5.3.4: calculating a coefficient of the weak classifier $C_t(X)$;

$$a_t = \frac{1}{2}\ln\left(\frac{1-\varepsilon_t}{\varepsilon_t}\right) \quad (3)$$

Step 5.3.5: updating the t-th sample weight distribution;

$$w_{t+1}(i) = \frac{w_t(i)}{Z_t} \times \begin{cases} e^{-a_t}, & C_t(x_i) = y_i \\ e^{a_t}, & C_t(x_i) \neq y_i \end{cases} = \frac{w_t(i)}{Z_t} \cdot e^{-a_t y_i C_t(x_i)}, \quad (4)$$

$$i = 1, 2, \ldots, N$$

in formula (4), $$Z_t = \sum_{i=1}^{N} w_t(i) \cdot e^{-a_t y_i C_t(x_i)}$$

is a normalization factor such that $$\sum_{i=1}^{N} w_{t+1}(i) = 1;$$

Step 5.4: outputting a final classifier, that is, the strong classification learner:

$$C(X) = \text{sgn}\left[\sum_{t=1}^{T} a_t C_t(X)\right] \quad (5)$$

In formula (5), a function sgn(•) is a symbolic function, and a specific mathematical expression of the function sgn(•) is:

$$\text{sgn}(k) = \begin{cases} 1, & k \geq 0 \\ -1, & k < 0 \end{cases}. \quad (6)$$

5. The method for early warning of the brandish of the transmission wire based on the Bayes-Adaboost algorithm according to claim 4, wherein:
the weak classifier described in Step 5 selects a commonly used single-layer decision tree, and evaluates pros and cons of a segmentation rule with a Gini impurity index, and a data set S containing c categories is defined as follows:

$$gini(S) = 1 - \sum_{j=1}^{c} p_j^2 \quad (7)$$

in formula (7), $p_j$ represents a proportion of samples of a category j in the data set S;
if a partition rule divides S into two subsets, $S_1$ and $S_2$, a Gini evaluation value of the rule is recorded as:

$$gini(S, rule) = \frac{n_1}{n} \cdot gini(S_1) + \frac{n_2}{n} \cdot gini(S_2) \quad (8)$$

in formula (8), $n_1$ is the number of samples in the subset $S_1$, $n_2$ is the number of samples in the subset $S_2$, and n is the number of samples in the set S.

6. The method for early warning of the brandish of the transmission wire based on the Bayes-Adaboost algorithm according to claim 5, wherein:
for one numerical attribute, an idea of binary classification decision pile segmentation based on a Gini index is as follows: after traversing all possible segmentation methods, a segmentation method that minimizes an evaluation value Gini(S,rule) is selected as an optimal segmentation rule at this node, specifically:
sample values of the numerical attribute are sorted, assuming that sorted results are $(x_1,y_1)$, $(x_2,y_2)$, ..., $(x_n,y_n)$; $y_i$ (i=1, 2, ..., n) is a category label;

a midpoint $(x_i+x_i+1)/2$ is taken as a dividing point, different dividing points from small to large are then taken, and a Gini value of each dividing rule is calculated according to formula (7) and formula (8);

a point with a smallest Gini value is taken as a best dividing point, and a decision pile is constructed with the dividing point as a threshold.

7. The method for early warning of the brandish of the transmission wire based on the Bayes-Adaboost algorithm according to claim 4, wherein:

in step 7, an output of a brandish early warning model of the transmission wire comprises a prediction result y of the final classifier and a confidence margin(x, y), specifically:

$$y = C(X) = \text{sgn}\left[\sum_{t=1}^{T} a_t C_t(X)\right] \quad (9)$$

$$\text{margin}(x, y) = \frac{\sum_t a_t C_t(x)}{\sum_t |a_t|} \quad (10)$$

in formula (10), x is the real-time meteorological forecast data of the brandish meteorological characteristic factors of the transmission wire;

$y \in \{-1,+1\}$, the prediction result of the final classifier is as follows: 1 is a prediction that the transmission wire brandishes, and −1 is a prediction that the transmission wire does not brandish;

margin$\in [-1,+1]$, a larger positive margin indicates a high confidence in predicting that the wire brandishes, a larger negative margin indicates a high confidence in predicting that the wire does not brandish, a smaller margin, that is, a margin closer to 0, indicates a lower confidence of the prediction result.

8. The method for early warning of the brandish of the transmission wire based on the Bayes-Adaboost algorithm according to claim 1, wherein:

characteristic parameters related to the meteorological condition comprise a maximum temperature, a minimum temperature, an average temperature, the change rate of the temperature in a first 24 hours, the humidity, the change rate of the humidity in the first 24 hours, a maximum wind speed, a minimum wind speed, an average wind speed, an included angle between the wind directions of the wire, a wire diameter, and the number of splits of the transmission wire.

9. The method for early warning of the brandish of the transmission wire based on the Bayes-Adaboost algorithm according to claim 1, wherein:

in step 10, the early warning level is divided according to the prediction probability in Step 9, and aerial meteorological information is introduced, that is: a freezing rain prediction result, if a freezing rain is provided in a brandish prediction area, a first-level early warning level is increased; if no freezing rain is provided, the early warning level remains unchanged, and the early warning probability and the early warning level of the brandish of the final transmission wire are output.

\* \* \* \* \*